United States Patent
Baek et al.

(10) Patent No.: US 11,764,347 B2
(45) Date of Patent: Sep. 19, 2023

(54) METHOD OF PREPARING POSITIVE ELECTRODE ACTIVE MATERIAL FOR SECONDARY BATTERY AND SECONDARY BATTERY USING THE SAME

(71) Applicant: LG Chem, Ltd., Seoul (KR)

(72) Inventors: Hyeon Hui Baek, Daejeon (KR); Sung Ho Ban, Daejeon (KR); Jun Ho Eom, Daejeon (KR); Na Ri Park, Daejeon (KR)

(73) Assignee: LG Chem, Ltd.

( * ) Notice: Subject to any disclaimer, the term of this patent is extended or adjusted under 35 U.S.C. 154(b) by 768 days.

(21) Appl. No.: 16/652,830

(22) PCT Filed: Oct. 17, 2018

(86) PCT No.: PCT/KR2018/012298
§ 371 (c)(1),
(2) Date: Apr. 1, 2020

(87) PCT Pub. No.: WO2019/078626
PCT Pub. Date: Apr. 25, 2019

(65) Prior Publication Data
US 2020/0313194 A1    Oct. 1, 2020

(30) Foreign Application Priority Data

Oct. 20, 2017    (KR) ........................ 10-2017-0136899

(51) Int. Cl.
| | | |
|---|---|---|
| *H01M 4/04* | (2006.01) | |
| *C01G 53/00* | (2006.01) | |
| *H01M 4/131* | (2010.01) | |
| *H01M 4/1391* | (2010.01) | |
| *H01M 4/505* | (2010.01) | |
| *H01M 4/525* | (2010.01) | |
| *H01M 4/62* | (2006.01) | |
| *H01M 10/0525* | (2010.01) | |
| *H01M 4/02* | (2006.01) | |

(52) U.S. Cl.
CPC .......... *H01M 4/0471* (2013.01); *C01G 53/50* (2013.01); *H01M 4/131* (2013.01); *H01M 4/1391* (2013.01); *H01M 4/505* (2013.01); *H01M 4/525* (2013.01); *H01M 4/628* (2013.01); *H01M 10/0525* (2013.01); *C01P 2004/61* (2013.01); *H01M 2004/028* (2013.01)

(58) Field of Classification Search
CPC .................................................. H01M 4/0471
See application file for complete search history.

(56) References Cited

U.S. PATENT DOCUMENTS

| | | |
|---|---|---|
| 2002/0192148 A1 | 12/2002 | Kweon et al. |
| 2012/0153225 A1 | 6/2012 | Ko et al. |
| 2013/0029216 A1* | 1/2013 | Kim ............. H01M 4/505 429/188 |
| 2014/0193714 A1 | 7/2014 | Kim et al. |
| 2014/0234718 A1 | 8/2014 | Lee et al. |
| 2014/0322609 A1 | 10/2014 | Choi et al. |
| 2015/0069293 A1 | 3/2015 | Park et al. |
| 2015/0090927 A1 | 4/2015 | Park et al. |
| 2015/0340683 A1 | 11/2015 | Hamano et al. |
| 2016/0233507 A1 | 8/2016 | Li et al. |
| 2016/0293952 A1 | 10/2016 | Kaneda et al. |
| 2016/0336583 A1 | 11/2016 | Smith et al. |
| 2017/0227223 A1 | 8/2017 | Hong et al. |
| 2018/0048015 A1 | 2/2018 | Lee et al. |
| 2018/0287135 A1* | 10/2018 | Shin ............. C01G 53/50 |
| 2019/0036119 A1* | 1/2019 | Lee ............. H01M 4/131 |
| 2022/0384798 A1* | 12/2022 | Groombridge ...... H01M 4/485 |

FOREIGN PATENT DOCUMENTS

| | | |
|---|---|---|
| CN | 102544465 A | 7/2012 |
| CN | 103545505 A | 1/2014 |
| CN | 104025346 A | 9/2014 |
| CN | 104364944 A | 2/2015 |
| CN | 104885266 A | 9/2015 |
| CN | 105765770 A | 7/2016 |
| CN | 105977476 A | 9/2016 |
| CN | 106450276 A | 2/2017 |
| CN | 106784696 A | 5/2017 |
| CN | 107251282 A | 10/2017 |

(Continued)

OTHER PUBLICATIONS

International Search Report from Application No. PCT/KR2018/012298 dated Jan. 23, 2019, 2 pages.

(Continued)

*Primary Examiner* — Amanda C. Walke

(74) *Attorney, Agent, or Firm* — Lerner David LLP

(57) ABSTRACT

Provided is a method of preparing a positive electrode active material, which includes preparing a mixture by mixing a lithium compound, a transition metal precursor, and a metal oxide additive, and sintering the mixture to form a lithium transition metal oxide, wherein the sintering is performed through two-stage temperature holding sections, a temperature of a first temperature holding section is in a range of 400° C. to 650° C., and a temperature of a second temperature holding section is in a range of 700° C. to 900° C. A positive electrode including a positive electrode active material prepared according to the method, and a lithium secondary battery including the positive electrode is also provided.

12 Claims, No Drawings

(56) References Cited

FOREIGN PATENT DOCUMENTS

| EP | 4124602 A1 * | 2/2023 | ........ H01M 10/0525 |
|----|---|---|---|
| JP | 2014123529 A | 7/2014 | |
| JP | 2015122298 A | 7/2015 | |
| KR | 20020092736 A | 12/2002 | |
| KR | 20130061038 A | 6/2013 | |
| KR | 20130102718 A | 9/2013 | |
| KR | 20140089851 A | 7/2014 | |
| KR | 20150042610 A | 4/2015 | |
| KR | 20160038984 A | 4/2016 | |
| KR | 20160063982 A | 6/2016 | |
| KR | 20170090196 A | 8/2017 | |
| WO | 2015064478 A1 | 5/2015 | |
| WO | 2015104538 A1 | 7/2015 | |

OTHER PUBLICATIONS

Search Report dated Dec. 6, 2021 from the Office Action for Chinese Application No. 201880066153.2 dated Dec. 14, 2021, 3 pgs.

* cited by examiner

METHOD OF PREPARING POSITIVE ELECTRODE ACTIVE MATERIAL FOR SECONDARY BATTERY AND SECONDARY BATTERY USING THE SAME

CROSS-REFERENCE TO RELATED APPLICATIONS

The present application is a national stage entry under 35 U.S.C. § 371 of International Application No. PCT/KR2018/012298 filed on Oct. 17, 2018, which claims priority to Korean Patent Application No. 10-2017-0136899, filed on Oct. 20, 2017, in the Korean Intellectual Property Office, the disclosures of which are incorporated herein in their entirety by reference.

TECHNICAL FIELD

The present invention relates to a method of preparing a positive electrode active material for a secondary battery and a secondary battery using the same, and more particularly, to a method of preparing a positive electrode active material for a secondary battery by a sintering process including two-stage temperature holding sections and a secondary battery using the same.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

Lithium-containing cobalt oxide ($LiCoO_2$) is mainly used as a positive electrode active material for a lithium secondary battery, and, in addition, the uses of lithium-containing manganese oxides, such as $LiMnO_2$ having a layered crystal structure and $LiMn_2O_4$ having a spinel crystal structure, and $LiNiO_2$, as a lithium-containing nickel oxide, are also in consideration. Among these positive electrode active materials, since $LiCoO_2$ has excellent life characteristics and charge and discharge efficiency, it has been the most widely used, but, since it has low capacity and is expensive due to resource limitations of cobalt used as a raw material, $LiCoO_2$ has a limitation in price competitiveness in terms of being massively used as a power source for medium and large battery sector such as electric vehicles. Lithium manganese oxides, such as $LiMnO_2$ and $LiMn_2O$, are advantageous in that they are inexpensive due to abundance of manganese resources used as a raw material, are environmentally friendly, and have excellent thermal stability, but have limitations in that capacities are low and high-temperature characteristics and cycle characteristics are poor.

In order to compensate for these disadvantages, demand for a nickel (Ni)-rich active material system, as a positive electrode active material of a secondary battery, has begun to increase. The Ni-rich active material system is advantageous in that it exhibits high capacity. However, with respect to the Ni-rich active material system, it has a limitation in that more lithium impurities remain on a surface of the active material than in the case where the active material is prepared from other types of lithium oxides. In this case, the lithium impurities remaining on the surface of the positive electrode active material may vaporize during charge/discharge of the battery to generate a large amount of gas, and the gas may expand a battery case to reduce safety of the battery. Also, if the lithium impurities remain on the surface of the positive electrode active material, when a positive electrode active material composition including the positive electrode active material is coated on a positive electrode collector, since the composition is gelated and agglomerated, defects on the electrode surface may occur.

Thus, research on a process for controlling a residual amount of the lithium-containing impurities has been rapidly increased while using the Ni-rich active material system, but satisfactory results have not yet been obtained.

DISCLOSURE OF THE INVENTION

Technical Problem

An aspect of the present invention provides a method of preparing a positive electrode active material, in which remaining of lithium impurities on a surface of the positive electrode active material may be suppressed by increasing reactivity between a lithium compound and a transition metal precursor, and a lithium secondary battery using the same.

Technical Solution

According to an aspect of the present invention, there is provided a method of preparing a positive electrode active material which includes preparing a mixture by mixing a lithium compound, a transition metal precursor, and a metal oxide additive; and sintering the mixture to form a lithium transition metal oxide, wherein the sintering is performed through two-stage temperature holding sections, a temperature of a first temperature holding section is in a range of 400° C. to 650° C., and a temperature of a second temperature holding section is in a range of 700° C. to 900° C.

According to another aspect of the present invention, there is provided a positive electrode including a positive electrode active material which is prepared according to the method of preparing a positive electrode active material.

According to another aspect of the present invention, there is provided a lithium secondary battery including the positive electrode, a negative electrode, a separator disposed between the positive electrode and the negative electrode, and an electrolyte.

Advantageous Effects

Since a method of preparing a positive electrode active material according to the present invention may improve reactivity between a lithium compound and a transition metal precursor in a first temperature holding section of 400° C. to 650° C. by using a difference in reactivity between a metal oxide additive and the transition metal oxide with the lithium compound, the method may suppress the formation of lithium impurities.

Also, in a second temperature holding section of 700° C. to 900° C., remaining of the lithium impurities may be suppressed by stabilizing a structure of lithium transition metal oxide formed by the reaction of the lithium compound with the transition metal precursor in the first temperature holding section.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

<Method of Preparing Positive Electrode Active Material>

Hereinafter, a method of preparing a positive electrode active material according to the present invention will be described.

The method of preparing a positive electrode active material according to the present invention includes the steps of: (1) preparing a mixture by mixing a lithium compound, a transition metal precursor, and a metal oxide additive, and (2) sintering the mixture to form a lithium transition metal oxide. Hereinafter, each step will be described in detail.

(1) Mixture Preparation Step

First, a mixture is prepared by mixing a lithium compound, a transition metal precursor, and a metal oxide additive.

The lithium compound is a reactant for forming a lithium transition metal oxide by being reacted with the transition metal precursor.

For example, the lithium compound, as a compound including lithium, is not particularly limited as long as it may be used as a lithium source. For example, the lithium compound may be at least one selected from the group consisting of lithium carbonate ($Li_2CO_3$), lithium hydroxide (LiOH), lithium nitrate ($LiNO_3$) and lithium hydrate ($LiOH \cdot H_2O$).

The lithium compound may be mixed in a molar ratio of 1.01:1 to 1.07:1, preferably 1.01:1 to 1.06:1, and more preferably 1.02:1 to 1.05:1 based on the transition metal precursor. Since the lithium compound has a property of being volatilized at a high temperature, the reaction may sufficiently occur when a relatively excessive amount of the lithium compound based on the transition metal precursor is added. Thus, it is desirable for the lithium compound to be mixed with the transition metal precursor within the above molar ratio range.

The transition metal precursor is a reactant for forming a lithium transition metal oxide by being reacted with the lithium compound.

For example, the transition metal precursor may include at least one transition metal cation selected from the group consisting of nickel (Ni), cobalt (Co), and manganese (Mn), and may be hydroxide, carbonate, or nitrate including the transition metal cation.

For example, the transition metal precursor may be represented by Formula 1 below.

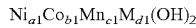

$Ni_{a1}Co_{b1}Mn_{c1}M_{d1}(OH)_2$ [Formula 1]

In Formula 1, a1, b1, c1, and d1 represent a molar ratio of each element in the compound, wherein a1 represents the molar ratio of nickel (Ni), b1 represents the molar ratio of cobalt (Co), c1 represents the molar ratio of manganese (Mn), and d1 represents the molar ratio of metallic element M.

In Formula 1, M may include at least one selected from the group consisting of aluminum (Al), zirconium (Zr), magnesium (Mg), zinc (Zn), yttrium (Y), iron (Fe), tungsten (W), and titanium (Ti), and $0.4 \leq a1 < 1.0$, $0 \leq b1 \leq 0.6$, $0 \leq c1 \leq 0.6$, $0 \leq d1 \leq 0.2$, and $a1+b1+c1+d1=1$.

More preferably, in Formula 1, $0.7 \leq a1 < 1.0$, $0 \leq b1 \leq 0.3$, $0 \leq c1 \leq 0.3$, $0 \leq d1 \leq 0.1$, and $a1+b1+c1+d1=1$, and, most preferably, $0.75 \leq a1 < 0.95$, $0.05 \leq b1 \leq 0.25$, $0.05 \leq c1 \leq 0.25$, $0.05 \leq d1 \leq 0.1$, and $a1+b1+c1+d1=1$. That is, more preferably, the transition metal precursor may contain Ni in an amount of 70 mol % or more (in Formula 1, a1 is 0.7 or more) based on total transition metals, and, in this case, high capacity may be achieved.

The metal oxide additive is a material having a difference in reactivity with the lithium compound when compared with the transition metal precursor, wherein it may be introduced as a doping source which is doped on a surface or/and the inside of the lithium transition metal oxide and may also function as a sintering catalyst capable of promoting the reaction between the lithium compound and the transition metal precursor in the sintering step described below.

For example, the metal oxide additive may be at least one selected from the group consisting of $ZrO_2$, ZnO, $Nb_2O_5$, MgO, $Fe_2O_3$, $V_2O_5$, $WO_3$, SiO, $SiO_2$, and $Sn_2O_3$, may preferably be ZnO or $ZrO_2$, and may more preferably be $ZrO_2$.

The metal oxide additive may be mixed in an amount of 0.01 wt % to 1.0 wt %, preferably 0.01 wt % to 0.5 wt %, and more preferably 0.05 wt % to 0.5 wt % based on a combined weight of the lithium compound and the transition metal precursor. When the metal oxide additive is added in an amount within the above range, reactivity between the lithium compound and the transition metal precursor may be improved while capacity of a lithium secondary battery is maintained above a predetermined level.

The lithium compound, the transition metal precursor, and the metal oxide additive may be used without limitation in a conventional dry process and a mixing process in which a dry process and a wet process are combined, and typical mixing may be performed for uniform mixing.

(2) Sintering Step

Next, a lithium transition metal oxide is formed by sintering the mixture. The sintering may be performed through two-stage temperature holding sections. The two-stage temperature holding sections are composed of a first temperature holding section and a second temperature holding section. In this case, a temperature of the first temperature holding section is in a range of 400° C. to 650° C., and a temperature of the second temperature holding section is in a range of 700° C. to 900° C.

Specifically, the sintering undergoes a section (first heating section) in which heat begins to be applied for the sintering of the mixture and the temperature is increased at a first heating rate before reaching the first temperature holding section—a section (first temperature holding section) in which a constant temperature is maintained after the first heating section—a section (second heating section) in which the temperature is increased at a second heating rate before reaching the second temperature holding section from the first temperature holding section a section (second temperature holding section) in which a constant temperature is maintained after the second heating section.

In a case in which a positive electrode active material is prepared from the lithium transition metal oxide, there is a limitation in that lithium impurities remaining without forming oxides with the transition metal precursor, for example, lithium oxide ($Li_2O$), lithium hydroxide (LiOH), lithium carbonate ($Li_2CO_3$), or lithium carbide ($Li_2C$), are generated. Particularly, with respect to a nickel-rich active material system, it has a limitation in that more lithium impurities remain on a surface of the positive electrode active material than in the case where the positive electrode active material is prepared from other types of lithium oxides.

Thus, in order to address the above-described limitations, the present inventors have studied a method of suppressing residual lithium impurities by increasing the reactivity between the lithium compound and the transition metal precursor.

As a result, the present inventors prepared a mixture, in which the metal oxide additive was mixed in addition to the lithium compound and the transition metal precursor, and designed a process in which a lithium transition metal oxide was formed by allowing the mixture to be subjected to the sintering step undergoing two-stage temperature holding sections.

In a case in which the lithium compound and the transition metal precursor were reacted and sintered in the first temperature holding section (400° C. to 650° C.), as a section in which a temperature lower than a temperature, at which the lithium compound generally reacted with the transition metal precursor, was constantly maintained, since reactivity between the lithium compound and the transition metal precursor was improved due to a difference in reactivity between the transition metal precursor and the metal oxide additive with the lithium compound, it was confirmed that a lithium transition metal oxide was formed in high yield and the remaining of the lithium impurities was suppressed.

Also, it was confirmed that a structure of the lithium transition metal oxide was stabilized during the second temperature holding section in which the temperature increased through the first heating section, in which the temperature was increased at a constant rate, was constantly maintained after the first temperature holding section.

Thus, if the metal oxide additive, in addition to the lithium compound and the transition metal precursor, was mixed and the lithium transition metal oxide was formed through the sintering step including the two-stage temperature holding sections, since an amount of the residual lithium impurities was reduced and the structure of the lithium transition metal oxide was stable, it may be confirmed that performance of the battery was improved.

The lithium compound reacts with the transition metal precursor during the first temperature holding section, wherein, since the reaction sufficiently occurs when the temperature in the above range is maintained, the lithium transition metal oxide may be formed. Also, since a temperature difference above a predetermined level is generated between the second temperature holding section and the first temperature holding section only if the first temperature holding section is formed within the above temperature range, the sintering may be performed through the two-stage temperature holding sections. Thus, it is desirable to set the first temperature holding section within the above range.

Crystallinity of the lithium transition metal oxide is improved while the lithium transition metal oxide passes through the second temperature holding section in the above temperature range. Accordingly, since a temperature difference above a predetermined level is generated between the second temperature holding section and the first temperature holding section only if the second temperature holding section is formed within the above temperature range, the sintering may be performed through the two-stage temperature holding sections, and thus, the structure of the lithium transition metal oxide may be stably formed.

The first heating section is a section in which the temperature is increased at a first heating rate until it reaches the temperature of the first temperature holding section from an initial condition.

The first heating rate may be in a range of 1.0° C./min to 3.0° C./min, preferably 1.3° C./min to 2.2° C./min, and more preferably 1.4° C./min to 1.9° C./min. The first heating rate takes into account the time required to reach the temperature reached during the formation of the lithium transition metal oxide, wherein the range of the first heating rate is not necessarily limited to the above range, but the first heating rate may vary depending on type and amount of the mixture and an average particle diameter ($D_{50}$) of the transition metal precursor.

The temperature of the first temperature holding section is in a range of 400° C. to 650° C., and the temperature of the first temperature holding section may vary depending on the average particle diameter ($D_{50}$) of the transition metal precursor.

The average particle diameter ($D_{50}$) may be defined as a particle diameter at 50% in a cumulative particle diameter distribution. In the present invention, the average particle diameter ($D_{50}$) of the transition metal precursor, for example, may be measured by electron microscopy using a scanning electron microscope (SEM) or field emission scanning electron microscope (FE-SEM), or using a laser diffraction method. Specifically, when measured by the laser diffraction method, the transition metal precursor is dispersed in a dispersion medium, the dispersion medium is introduced into a commercial laser diffraction particle size measurement instrument (e.g., Microtrac MT 3000) and irradiated with ultrasonic waves having a frequency of about 28 kHz and an output of 60 W, and the average particle diameter ($D_{50}$) at 50% in a cumulative particle diameter distribution of the measurement instrument may then be calculated.

For example, in a case in which the average particle diameter ($D_{50}$) of the transition metal precursor is in a range of 5 μm to 10 μm, the temperature of the first temperature holding section may be in a range of 400° C. to 600° C., preferably 400° C. to 550° C., and more preferably 400° C. to 500° C.

As another example, in a case in which the average particle diameter ($D_{50}$) of the transition metal precursor is greater than 10 μm, the temperature of the first temperature holding section may be in a range of 500° C. to 650° C., preferably 500° C. to 620° C., and more preferably 500° C. to 600° C.

The first temperature holding section is a section in which the lithium compound reacts with the transition metal precursor to form a lithium transition metal oxide, wherein the metal oxide additive added as a doping source, which is doped on the surface and/or the inside of the lithium transition metal oxide, may also function as a sintering catalyst.

The smaller the average particle diameter ($D_{50}$) of the transition metal precursor is, the larger the specific surface area of the transition metal precursor is. Thus, in a case in which the average particle diameter ($D_{50}$) of the transition metal precursor is in a range of 5 μm to 10 μm, the specific surface area is larger than that of the case where the average particle diameter ($D_{50}$) is greater than 10 μm.

In a case in which the transition metal precursor having a larger specific surface area is used, since a thermal gradient is large, heat diffuses faster. Thus, in a case in which the average particle diameter ($D_{50}$) of the transition metal precursor is small, since its specific surface area is larger, the lithium compound and the transition metal precursor may sufficiently react even if the lithium compound and the transition metal precursor pass through the first temperature holding section in a relatively low temperature range.

Thus, the first temperature holding section may be maintained at a temperature within the above range according to the average particle diameter ($D_{50}$) of the transition metal precursor.

Holding time of the first temperature holding section may be in a range of 2 hours to 8 hours, preferably 3 hours to 8 hours, and more preferably 4 hours to 8 hours. The holding time of the first temperature holding section may vary depending on the average particle diameter ($D_{50}$) of the transition metal precursor and the holding temperature of the first temperature holding section.

The second heating section is a section in which the temperature is increased at a second heating rate before reaching the second temperature holding section after the first temperature holding section.

The second heating rate may be in a range of 1.0° C./min to 3.0° C./min, preferably 1.3° C./min to 2.2° C./min, and more preferably 1.4° C./min to 1.9° C./min.

The second heating rate takes into account the time required to reach the temperature reached during the formation of the lithium transition metal oxide, wherein the second heating rate may be the same as or different from the first heating rate and is not necessarily limited to the above range, but the second heating rate may vary depending on type and amount of the mixture and an average particle diameter ($D_{50}$) of the transition metal precursor.

The temperature of the second temperature holding section may be in a range of 700° C. to 900° C., preferably 700° C. to 850° C., and more preferably 700° C. to 820° C.

The second temperature holding section is a second in which the structure is stabilized while the crystallinity of the lithium transition metal oxide formed by the reaction of the lithium compound with the transition metal precursor is improved. If the structure of the lithium transition metal oxide is stabilized, lithium ions may move smoothly during charge/discharge of the battery. Thus, in a case in which a positive electrode is prepared from a positive electrode active material including the lithium transition metal oxide with a stabilized structure, the performance of the battery may be improved.

Holding time of the second temperature holding section may be in a range of 4 hours to 12 hours, preferably 6 hours to 12 hours, and more preferably 8 hours to 12 hours. The holding time of the second temperature holding section may vary depending on a degree of stabilization of the structure as crystals of the lithium transition metal oxide grow.

<Positive Electrode>

Hereinafter, a positive electrode including a positive electrode active material prepared according to the above preparation method will be described.

Specifically, the positive electrode includes a positive electrode collector and a positive electrode active material layer which is disposed on the positive electrode collector and includes the above-described positive electrode active material.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

Also, the positive electrode active material layer may include a conductive agent and a binder in addition to the above-described positive electrode active material.

In this case, the conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 1 wt % to 30 wt % based on the total weight of the positive electrode active material layer.

Furthermore, the binder improves the adhesion between the positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 1 wt % to 30 wt % based on the total weight of the positive electrode active material layer.

The positive electrode may be prepared according to a typical method of preparing a positive electrode except that the above-described positive electrode active material is used. Specifically, a composition for forming a positive electrode active material layer in the form of a slurry, which includes the above-described positive electrode active material as well as selectively the binder and the conductive agent, is coated on the positive electrode collector, and the positive electrode may then be prepared by drying and rolling the coated positive electrode collector. In this case, types and amounts of the positive electrode active material, the binder, and the conductive are the same as those previously described.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive agent, and the binder in consideration of a coating thickness of the composition for forming a positive electrode active material layer and manufacturing yield, and may allow to have a viscosity that may provide excellent thickness uniformity during the subsequent coating for the preparation of the positive electrode.

Also, as another method, the positive electrode may be prepared by casting the composition for forming a positive electrode active material layer on a separate support and then laminating a film separated from the support on the positive electrode collector.

<Lithium Secondary Battery>

Hereinafter, a lithium secondary battery including the positive electrode, a negative electrode, a separator disposed between the positive electrode and the negative electrode, and an electrolyte will be described.

The lithium secondary battery specifically includes a positive electrode, a negative electrode disposed to face the positive electrode, a separator disposed between the positive electrode and the negative electrode, and an electrolyte, wherein the positive electrode is as described above. Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 µm to 500 µm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material. The negative electrode active material layer may be prepared by coating a composition for forming a negative electrode in the form of a slurry, which includes selectively the binder and the conductive agent as well as the negative electrode active material, on the negative electrode collector and drying the coated negative electrode collector, or may be prepared by casting the composition for forming a negative electrode on a separate support and then laminating a film separated from the support on the negative electrode collector.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_x$ (0<x<2), $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

Also, the binder and the conductive agent may be the same as those previously described in the positive electrode.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

EXAMPLES

Example 1

After LiOH and $Ni_{0.75}Co_{0.125}Mn_{0.125}(OH)_2$ having an average particle diameter ($D_{50}$) of 15 μm were mixed in a molar ratio of 1.03:1 and $ZrO_2$ was added in an amount of 0.5 wt % based on a combined weight of the lithium compound and the transition metal precursor, the mixture was put in a planetary mixer and mixed at 1,000 rpm for 10 minutes to prepare a mixture.

The mixture was heated to 530° C. at a rate of 1.4° C./min in a box-type heat treatment furnace and maintained at 530° C. for 4 hours, and the temperature was further increased to 820° C. at a rate of 1.4° C./min and was then maintained at 820° C. for 8 hours to prepare a positive electrode active material.

Example 2

After LiOH and $Ni_{0.75}Co_{0.125}Mn_{0.125}(OH)_2$ having an average particle diameter ($D_{50}$) of 5 μm were mixed in a molar ratio of 1.02:1 and $ZrO_2$ was added in an amount of 0.5 wt % based on a combined weight of the lithium compound and the transition metal precursor, the mixture was put in a planetary mixer and mixed at 1,000 rpm for 10 minutes to prepare a mixture.

The mixture was heated to 450° C. at a rate of 1.4° C./min in a box-type heat treatment furnace and maintained at 450° C. for 4 hours, and the temperature was further increased to 780° C. at a rate of 1.4° C./min and was then maintained at 780° C. for 8 hours to prepare a positive electrode active material.

Example 3

A positive electrode active material was prepared in the same manner except that $ZrO_2$ was added in an amount of 1.0 wt % based on the combined weight of the lithium compound and the transition metal precursor in Example 1.

COMPARATIVE EXAMPLES

Comparative Example 1

A positive electrode active material was prepared in the same manner except that $ZrO_2$ was not added in Example 1.

Comparative Example 2

A positive electrode active material was prepared in the same manner except that $ZrO_2$ was not added in Example 2.

Comparative Example 3

A positive electrode active material was prepared in the same manner except that, in Example 1, $ZrO_2$ was not added, and the mixture was heated to 820° C. at a rate of 1.4° C./min and was then maintained at 820° C. for 12 hours to directly prepare the positive electrode active material.

Preparation Example: Preparation of Lithium Secondary Batteries

Lithium secondary batteries were respectively prepared by using the positive electrode active materials prepared in Examples 1 to 3 and Comparative Examples 1 to 3.

Specifically, each of the positive electrode active materials prepared in Examples 1 to 3 and Comparative Examples 1 to 3, a carbon black conductive agent, and a PVDF binder were mixed in an N-methylpyrrolidone solvent at a weight ratio of 95:2.5:2.5 to prepare a composition for forming a positive electrode (viscosity: 5,000 mPa·s), and an aluminum current collector was coated with the composition, dried at 130° C., and then rolled to prepared a positive electrode.

Also, natural graphite as a negative electrode active material, a carbon black conductive agent, and a PVdF binder were mixed in an N-methylpyrrolidone solvent at a weight ratio of 85:10:5 to prepare a composition for forming a negative electrode, and a copper current collector was coated with the composition to prepare a negative electrode.

Each lithium secondary battery was prepared by preparing an electrode assembly by disposing a porous polyethylene separator between the positive electrode and the negative electrode prepared as described above, disposing the electrode assembly in a case, and then injecting a liquid electrolyte into the case. In this case, the liquid electrolyte was prepared by dissolving 1.0 M lithium hexafluorophosphate (LiPF$_6$) in an organic solvent composed of ethylene carbonate/dimethyl carbonate/ethylmethyl carbonate (mixing volume ratio of EC/DMC/EMC=3/4/3).

Experimental Example 1: Evaluation of Lithium-Containing Impurity Residual Amount Positive electrode active material powders prepared in Examples 1 to 3 and Comparative Examples 1 to 3 were dissolved in water and were then titrated with hydrochloric acid, and amounts of LiOH and Li$_2$CO$_3$ included in the positive electrode active material powders are presented in Table 1.

TABLE 1

|  | LiOH content (wt %) | Li$_2$CO$_3$ content (wt %) | Total content (wt %) |
|---|---|---|---|
| Example 1 | 0.185 | 0.13 | 0.315 |
| Example 2 | 0.238 | 0.243 | 0.481 |
| Example 3 | 0.175 | 0.206 | 0.381 |
| Comparative Example 1 | 0.254 | 0.164 | 0.418 |
| Comparative Example 2 | 0.270 | 0.305 | 0.575 |
| Comparative Example 3 | 0.299 | 0.148 | 0.447 |

Referring to Table 1, when the transition metal precursors having the same average particle diameter (D$_{50}$) were compared, a total amount of LiOH and Li$_2$CO$_3$ in Example 1 was lower than those in Comparative Examples 1 and 3, and a total amount of LiOH and Li$_2$CO$_3$ in Example 2 was lower than that in Comparative Example 2.

Experimental Example 2: Evaluation of Charge and Discharge Characteristics of Lithium Secondary Battery Charge and discharge characteristics among battery characteristics of the lithium secondary batteries respectively prepared by using the positive electrode active materials prepared in Examples 1 to 3 and Comparative Examples 1 to 3 were evaluated.

The prepared lithium secondary batteries were charged at a constant current (CC) of 0.2 C to a voltage of 4.25 V at 25° C., and thereafter, charge in the first cycle was performed by charging the lithium secondary batteries at a constant voltage (CV) of 4.25 V to a charge current of 0.05 mAh. After the lithium secondary batteries were left standing for minutes, the batteries were discharged at a constant current of 0.2 C to a voltage of 3.0 V. The charging and discharging were set as one cycle, and charge/discharge capacities in the first cycle and charge and discharge efficiency were measured. The results thereof are presented in Table 2 below.

TABLE 2

|  | Charge capacity (mAh/g) | 0.2 C discharge capacity (mAh/g) | Charge and discharge efficiency (%) |
|---|---|---|---|
| Example 1 | 215.4 | 182.2 | 84.6 |
| Example 2 | 215.3 | 191.5 | 89.0 |
| Example 3 | 210.3 | 175.8 | 83.6 |
| Comparative Example 1 | 216.0 | 179.9 | 83.3 |
| Comparative Example 2 | 211.2 | 188.1 | 89.0 |
| Comparative Example 3 | 213.7 | 169.6 | 79.4 |

Referring to Table 2, when the examples and the comparative examples were compared, it may be confirmed that charge and discharge efficiencies of the examples were equal to or greater than those of the comparative examples.

Experimental Example 3: Analysis of Positive Electrode Active Material

X-ray diffraction measurements of the positive electrode active materials prepared in Examples 1 and 2 and Comparative Examples 1 and 2 were performed, and the results of calculating a crystallite size of a (003) plane of each positive electrode active material according to the following Scherrer equation are presented in Table 3.

The X-ray diffraction measurements, for example, may be performed in a 2θ range of 10° to 89.5° by an X-ray diffractometer manufactured by Bruker Corporation using a CuKα radiation source with a wavelength of 1.5406 Å.

The crystallite size was calculated by introducing a value measured by the X-ray diffractometer, for example, a full width half maximum into the Scherrer equation [D(Å)=K*λ/(β*cos θ): where K is an integer, λ is a wavelength of X-ray, β is broadening of diffraction line due to the size of the crystallite, and θ is diffraction angle 2θ/θ].

TABLE 3

|  | Crystallite size (nm) |
|---|---|
| Example 1 | 75.4 |
| Example 2 | 65.5 |
| Comparative Example 1 | 68.2 |
| Comparative Example 2 | 54.7 |

Referring to Table 3, in a case in which the transition metal precursors having the same average particle diameter (D$_{50}$) were compared, it may be confirmed that the crystallite size of Example 1 was relatively larger than that of Comparative Example 1 when Example 1 and Comparative Example 1 were compared, and the crystallite size of Example 2 was relatively larger than that of Comparative Example 2 when Example 2 and Comparative Example 2 were compared. The larger crystallite size denotes better crystallinity of the prepared positive electrode active material.

The invention claimed is:
1. A method of preparing a positive electrode active material, comprising:
    sintering a mixture to form a positive electrode active material that comprises a lithium transition metal oxide, wherein the mixture includes a lithium compound, a transition metal precursor, and a metal oxide additive, and wherein the sintering comprising:

sintering in a first temperature holding section having a temperature in a range of 400° C. to 650° C. for a first holding time; and sintering in a second temperature holding section having a temperature in a range of 700° C. to 900° C. for a second holding time to form the positive electrode active material.

2. The method of claim 1, wherein the metal oxide additive comprises at least one of $ZrO_2$, ZnO, $Nb_2O_5$, MgO, $Fe_2O_3$, $V_2O_5$, $WO_3$, SiO, $SiO_2$, or $Sn_2O_3$.

3. The method of claim 1, wherein the metal oxide additive is mixed in an amount of 0.01 wt % to 1.0 wt % based on a combined weight of the lithium compound and the transition metal precursor.

4. The method of claim 1, wherein, when an average particle diameter ($D_{50}$) of the transition metal precursor is in a range of 5 μm to 10 μm, the temperature of the first temperature holding section is in the range of 400° C. to 600° C.

5. The method of claim 1, wherein an average particle diameter ($D_{50}$) of the transition metal precursor is greater than 10 μm, the temperature of the first temperature holding section is in the range of 500° C. to 650° C.

6. The method of claim 1, wherein the transition metal precursor comprises at least one of nickel (Ni), cobalt (Co), or manganese (Mn).

7. The method of claim 6, wherein the transition metal precursor is $Ni_{a1}Co_{b1}Mn_{c1}M_{d1}(OH)_2$, wherein M comprises at least one of aluminum (Al), zirconium (Zr), magnesium (Mg), zinc (Zn), yttrium (Y), iron (Fe), tungsten (W), and titanium (Ti), and $0.4 \leq a1 \leq 1.0$, $0 \leq b1 \leq 0.6$, $0 \leq c1 \leq 0.6$, $0 \leq d1 \leq 0.2$, and $a1+b1+c1+d1=1$.

8. The method of claim 7, wherein the transition metal precursor includes Ni in an amount of 70 mol % or more based on a total transition metals.

9. The method of claim 1, wherein a first heating rate before reaching the first temperature holding section is in a range of 1.0° C./min to 3.0° C./min.

10. The method of claim 1, wherein a second heating rate before reaching the second temperature holding section from the first temperature holding section is in a range of 1.0° C./min to 3.0° C./min.

11. The method of claim 1, wherein the first holding time of the first temperature holding section is in a range of 2 hours to 8 hours.

12. The method of claim 1, wherein the second holding time of the second temperature holding section is in a range of 4 hours to 12 hours.

* * * * *